(12) United States Patent
Fleming et al.

(10) Patent No.: US 8,857,372 B2
(45) Date of Patent: Oct. 14, 2014

(54) METHOD OF FABRICATING OPTICAL FIBER USING AN ISOTHERMAL, LOW PRESSURE PLASMA DEPOSITION TECHNIQUE

(75) Inventors: James Fleming, Westfield, NJ (US); George Zydzik, Columbia, NJ (US)

(73) Assignee: OFS Fitel, LLC

( * ) Notice: Subject to any disclaimer, the term of this patent is extended or adjusted under 35 U.S.C. 154(b) by 753 days.

(21) Appl. No.: 12/890,983

(22) Filed: Sep. 27, 2010

(65) Prior Publication Data

US 2011/0067451 A1    Mar. 24, 2011

Related U.S. Application Data

(63) Continuation-in-part of application No. 12/001,174, filed on Dec. 10, 2007.

(51) Int. Cl.
| | |
|---|---|
| B05D 5/06 | (2006.01) |
| B05D 7/22 | (2006.01) |
| B05D 3/06 | (2006.01) |
| C03B 37/01 | (2006.01) |
| C03B 37/018 | (2006.01) |
| C03B 37/022 | (2006.01) |

(52) U.S. Cl.
CPC ................ C03B 37/0183 (2013.01)
USPC ....... 118/723 R; 427/487; 427/488; 427/508; 427/509; 427/535; 427/569; 427/573; 427/162; 427/163.1; 427/163.2; 427/164; 427/165; 427/166; 427/169; 427/230; 427/237; 427/238; 65/391; 65/393; 65/413; 65/417; 65/436

(58) Field of Classification Search
USPC ......... 427/230–237, 487, 488, 508, 535, 569, 427/573, 162, 163.1, 163.2, 164, 165, 166, 427/169, 238; 118/723 R; 65/391, 393, 413, 65/417, 436
See application file for complete search history.

(56) References Cited

U.S. PATENT DOCUMENTS

| | | | |
|---|---|---|---|
| 4,263,032 A | 4/1981 | Sinclair et al. | |
| 4,314,833 A | 2/1982 | Kuppers | |
| 4,493,721 A | 1/1985 | Auwerda et al. | |
| 4,507,135 A | 3/1985 | Morse | |
| 5,188,648 A | 2/1993 | Geittner et al. | |
| 5,578,106 A | 11/1996 | Fleming, Jr. et al. | |
| 6,305,195 B1 | 10/2001 | Fleming, Jr. et al. | |
| 6,347,174 B1 | 2/2002 | Onishi et al. | |
| 7,068,895 B2 | 6/2006 | Kuijpers et al. | |
| 7,068,899 B2 | 6/2006 | Milicevic et al. | |
| 7,116,877 B2 | 10/2006 | Kuijpers et al. | |
| 7,156,046 B2 | 1/2007 | Tamagaki et al. | |
| 7,290,408 B1 | 11/2007 | Humbert et al. | |
| 2005/0284184 A1 | 12/2005 | Baynham et al. | |
| 2007/0003197 A1 | 1/2007 | Matthijsse et al. | |

*Primary Examiner* — William Phillip Fletcher, III
(74) *Attorney, Agent, or Firm* — Wendy W. Koba (57) ABSTRACT

An isothermal, low pressure-based process of depositing material within a substrate has been developed and results in creating an extremely narrow reaction zone within which a more uniform and efficient deposition will occur. Sets of isothermal plasma operating conditions have been found that create a narrow deposition zone, assuring that the deposited material is clear glass rather than soot particles. The chemical delivery system, in one arrangement, utilizes rods of solid phase source material (which may otherwise be difficult to obtain in gaseous form). The operating conditions are selected such that the hot plasma does not transfer a substantial amount of heat to the substrate tube, where the presence of such heat has been found to result in vaporizing the reactant material (creating soot) and developing hot spots.

23 Claims, 5 Drawing Sheets

| TUBE ID mm | TUBE OD mm | Vac mbar | KV | Amps | kW | He cc/min | Ar cc/min | O_2 cc/min | SiCl_4 cc/min | C_2F_6 cc/min | GeCl_4 cc/min | OD T °C | ID T °C | TRANSVERSE cm/min | PLAS LEN cm | TRAV LEN cm |
|---|---|---|---|---|---|---|---|---|---|---|---|---|---|---|---|---|
| 28 | 32 | 10 | 4 | 2.68 | 10.7 | | 500 | 160 | 100 | 100 | | 1000 | 1098 | 200 | 6 | 80 |
| 19 | 25 | 3 | 4 | 2.68 | 10.7 | | 500 | 160 | 100 | 0 | 25 | 1000 | 1234 | 200 | 6 | 80 |
| 46 | 50 | 5 | 4 | 2.68 | 10.7 | | 500 | 160 | 100 | 0 | 50 | 1000 | 1029 | 400 | 6 | 80 |
| 28 | 32 | 2.5 | 4 | 2.68 | 10.7 | | | 160 | 200 | 0 | 100 | 1000 | 1024 | 800 | 6 | 80 |
| 28 | 32 | 2.5 | 3.6 | 2.68 | 9.6 | 500 | 500 | 160 | 200 | 0 | 100 | 1000 | 1022 | 800 | 6 | 80 |

FIG. 5
LOW PRESSURE RF PLASMA
NON-ISOTHERMAL
(a)

ISOTHERMAL
(b)

METHOD OF FABRICATING OPTICAL FIBER USING AN ISOTHERMAL, LOW PRESSURE PLASMA DEPOSITION TECHNIQUE

CROSS-REFERENCE TO RELATED APPLICATIONS

This application is a continuation-in-part of U.S. application Ser. No. 12/001,174, filed Dec. 10, 2007.

TECHNICAL FIELD

The present invention relates to a plasma technique for depositing material in a substrate tube and, more particularly, to an isothermal, low pressure process that results in creating an extremely narrow reaction zone in the tube from which a more uniform and efficient deposition will occur.

BACKGROUND OF THE INVENTION

Optical fiber typically contains a high-purity silica glass core optionally doped with a refractive index-raising element (such as germanium), an inner cladding of high-purity silica glass optionally doped with a refractive index-lowering element (such as fluorine), and an outer cladding of undoped silica glass. In some manufacturing processes, the preforms for making such fiber are fabricated by using a glass tube for the outer cladding (referred to as an overcladding tube), and separately forming a core rod containing the core and inner cladding material. The core rods are fabricated by any of a variety of vapor deposition methods known to those skilled in the art, including vapor axial deposition (VAD), outside vapor deposition (OVD), and modified chemical vapor deposition (MCVD). MCVD, for example, involves passing a high-purity gas, e.g., a mixture of gases containing silicon and germanium, through the interior of a silica tube (also referred to as a "substrate tube") while heating the outside of the tube with a traversing oxy-hydrogen torch. In the heated area of the tube, a gas phase reaction occurs that deposits particles on the tube wall. This deposit, which forms ahead of the torch (referred to as "downstream"), is sintered as the torch passes over it. The process is repeated in successive passes until the requisite quantity of silica and/or germanium-doped silica is deposited. Once deposition is complete, the body is heated to collapse the substrate tube and obtain a consolidated core rod in which the substrate tube constitutes the outer portion of the inner cladding material. To obtain a finished preform, the overcladding tube is typically placed over the core rod, and the components are heated and collapsed into the final preform structure.

As an alternative to MCVD, a plasma chemical vapor deposition (PCVD) process may be used. In the PCVD method, the substrate tube passes through a microwave applicator (also referred to as an activator chamber, or activator head), which forms an electro-magnetic field around and inside the tube. A non-isothermal, low-pressure plasma is generated inside the tube by the interaction of the electro-magnetic field with the feed (e.g., $SiCl_4$, $GeCl_4$, and $O_2$). Chemical reactions are then enabled to form glass molecules that deposit themselves on the inside of the tube. An external heat source (such as a furnace) is required in PCVD to heat the substrate during deposition to ensure that the deposited glass is of a form that can be subsequently fused to clear glass. Once deposition is complete, the body is heated to collapse the substrate tube (in a manner similar to MCVD) and obtain a consolidated core rod in which the substrate tube constitutes the outer portion of the inner cladding material. To obtain a finished preform, an overcladding tube is typically placed over the core rod, and the components are heated and collapsed into the final preform structure.

These current methods of providing deposition of the preform materials using MCVD or PCVD exhibit deposition problems resulting from the relatively long deposition zone widths inherent in these processes (i.e., the extent of the deposition along the tube at any given instant of time). In MCVD, glass precursor vapors are introduced through a seal into the end of a substrate tube of length generally between one and three meters. The vapors encounter a reaction zone and are converted to oxides that deposit as soot on the inner tube wall. The widths of these zones of deposition are generally wider than the reaction zones and can be as much as 10-30% of the overall substrate tube length. As a result, the deposited material at the ends of the tube sometimes exhibits a non-uniform thickness, thereby adversely affecting the overall preform. Further, when multi-component compositions are being deposited (such as germanium silicates), the deposited regions tend to be nonuniform in composition as a function of zone position, due to different reaction rates of the glass constituents.

In PCVD, the reaction takes place within the created plasma region, the length of which is generally 10-20% of the overall substrate tube length. As in MCVD, there is a variation in reactivity within the plasma, resulting in variations in the thickness and/or composition of the reacted components. Therefore, the glass that is deposited on the inside of the substrate tube at any given time using a PCVD process can be non-uniform in terms of thickness and/or composition.

Moreover, the deposited cores in preforms made by these processes may vary in diameter and optical properties along the deposited length, also affecting the quality of the resulting fiber. Further, in MCVD, the soot formed in the reaction zone is capable of traveling the length of the tube and can potentially deposit itself at any point along the tube, regardless of the reaction zone location, thus leading to a certain degree of unpredictability in the deposition process.

In view of these deficiencies, there exists a need to improve the quality of materials deposited within substrate tubes.

SUMMARY OF THE INVENTION

The needs remaining in the prior art are addressed by the invention, which relates to a plasma technique for depositing material within a substrate tube and, more particularly, to an isothermal, low-pressure plasma process that results in creating a narrow reaction zone within which a more uniform and efficient deposition will occur.

In accordance with the present invention, isothermal, low pressure plasma operating conditions have been found that generate a narrow deposition zone upstream of the plasma (i.e., a location between the introduction of the reactant materials and the plasma). These operating conditions depend upon a number of interacting parameters. In essence, the key objective is to provide sufficient energy density for the creation of a narrow reaction zone, while not exceeding a heat level that would otherwise vaporize the inner surface of the substrate tube.

In some embodiments of the present invention, the exhaust end of the substrate tube is connected, through a vacuum system, to a scrubber apparatus for removal and neutralization of reaction by-products.

It is an aspect of the present invention that the isothermal, low pressure deposition process is particularly well-suited for the manufacture of optical fiber core rods that require precision core profiles (such as, for example, multimode core rods), since the deposition occurs in a very narrow zone (generally about one centimeter or less), in very thin layers, and does not require sintering.

It is a further aspect of the present invention that the utilization of an isothermal, low pressure deposition zone upstream of the plasma allows for the reactant delivery system to include a solid rod of a selected source material. The availability of solid phase source materials allows for the fabrication of optical fiber with glass compositions heretofore unavailable in vapor phase deposition processes. In an alternative embodiment, a combination of solid phase source materials and conventional vapor phase reactants may be employed.

A preferred embodiment of the present invention utilizes a concentrator-type coil in the plasma generator apparatus, so as to shape the generated electro-magnetic flux such that a field-defined plasma can be used to create the molten glass particles at lower power.

Other and further aspects and advantages of the present invention will become apparent during the course of the following discussion and by reference to the accompanying drawings.

BRIEF DESCRIPTION OF THE DRAWINGS

Referring now to the drawings,

FIGS. 5($a$) and ($b$) provide a comparison between a non-isothermal plasma (FIG. 5($a$)) and an isothermal plasma (FIG. 5($b$)

DETAILED DESCRIPTION

Figure 1:
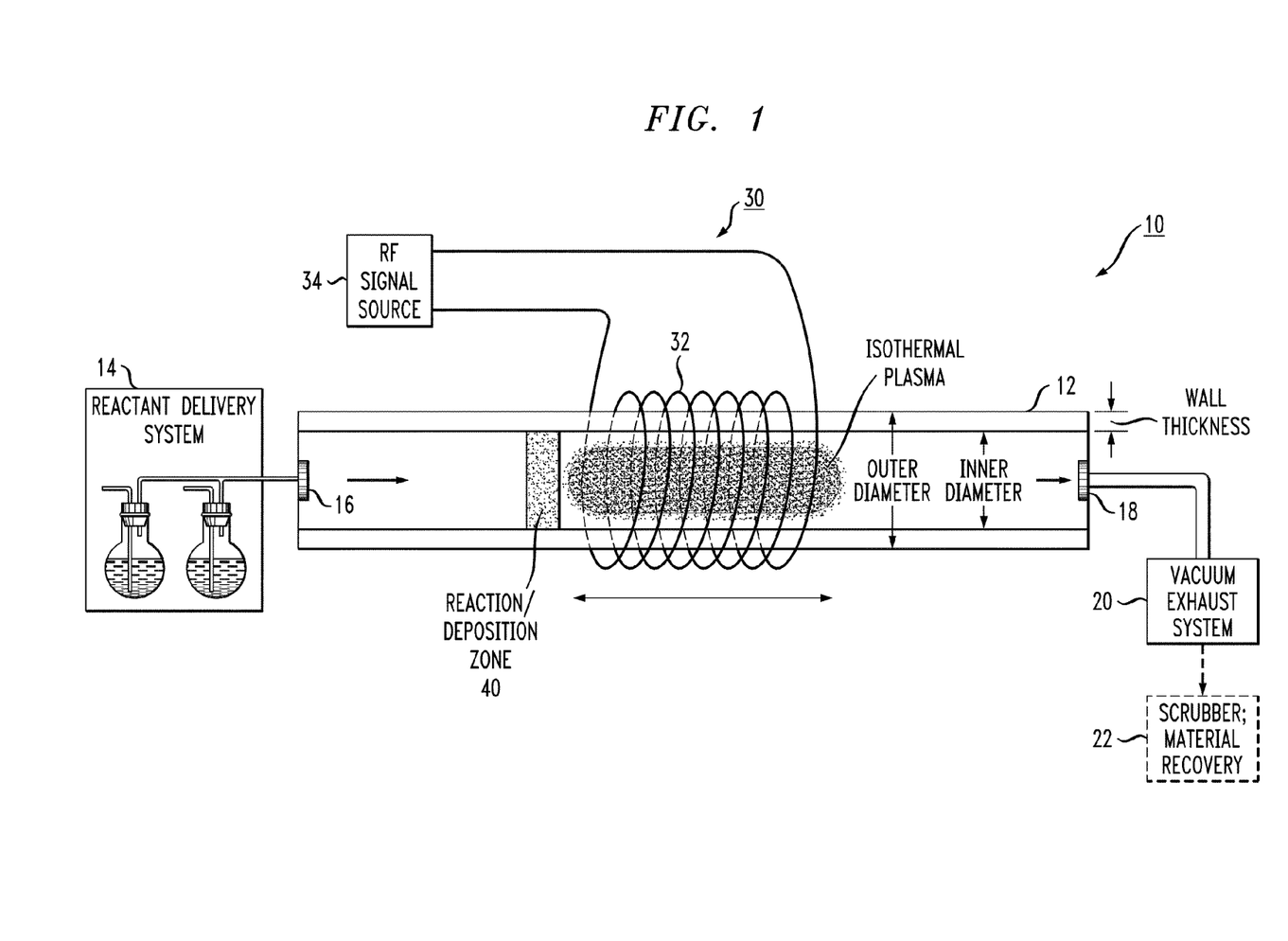
FIG. 1 illustrates an exemplary apparatus for performing the deposition process of the present invention.

FIG. 1 illustrates an exemplary apparatus 10 that may be used to practice the low pressure, isothermal deposition method of the present invention. As mentioned above and discussed in detail below, several operating parameters of apparatus 10 are controlled to allow for the formation of an extremely narrow deposition zone immediately upstream of the created plasma. In accordance with one embodiment of the present invention, the deposition conditions are controlled such that the narrow deposition zone occupies about only 1% of the length of a conventional substrate tube (as opposed to the 10-30% values associated with the prior art MCVD and PCVD processes). More broadly, the particular conditions utilized with the teachings of the present invention result in a narrow deposition zone of one centimeter or less. A tube 12 is used in apparatus 10 as the substrate tube within which the deposition will occur, where the inner diameter (ID) and outer diameter (OD) of tube 12 are two of the operating parameters that are accounted for in developing the proper set of narrow zone deposition conditions, since the wall thickness also has an effect on the temperature of the inside wall and the reaction chemistry at the wall's surface. In one embodiment, tube 12 may comprise a silica material.

Apparatus 10 further comprises a chemical delivery system 14 to deliver one or more chemical reactants (such as $GeCl_4$, $SiCl_4$, $C_2F_6$ and $O_2$) into substrate tube 12 through a first seal 16 formed within a first end of tube 12. Although not shown in FIG. 1 (and not essential to the operation of the apparatus), substrate tube 12 is typically mounted in a glass working lathe that maintains the integrity of first seal 16 while rotating tube 12. The opposing end of tube 12 is coupled through a second seal 18 to a vacuum exhaust system 20. Advantageously, exhaust system 20 may be connected to a scrubber apparatus 22, which is used for removal and neutralization of any reaction by-products. In an embodiment where substrate tube 12 is mounted in a rotating lathe, seals 16 and 18 may comprise a rotary type of seal that is capable of maintaining the integrity of the internal pressure within the tube. The use of a scrubber is considered to be optional.

As shown in FIG. 1, an isothermal plasma generator 30 is included in apparatus 10 and used to create a plasma of sufficient energy density within substrate tube 12 to provide the desired chemical reaction(s) with the delivered material. In most cases, generator 30 is mounted on a movable table (not shown) such that it can be traversed parallel to the axis of the mounted substrate tube, indicated by the double-ended arrow in FIG. 1. Isothermal plasma generator 30 comprises a resonant coil 32 that is positioned to surround a relatively short extent of tube 12, as shown in FIG. 1 (i.e., creating a cavity). An RF signal source 34 is coupled to resonant coil 32 and used to supply an RF signal thereto, thus creating the electro-magnetic flux within tube 12. The combination of the incoming chemical reactants with the electro-magnetic flux thus forms a plasma of an energy density sufficient to trigger the reaction and deposition of material on the inner surface of tube 12.

Although not necessary for the implementation of the process for all possible operating conditions the apparatus may also employ an external heating device (such as a furnace or linear burner) to control the temperature of the substrate tube during the deposition phase. The external heat assures that the deposited material adheres well to the substrate tube and avoids cracking of the material during deposition. As mentioned above, the thickness of the tube wall itself is one factor that is considered when determining if an external heating device is required.

In accordance with the present invention, an "isothermal" plasma is generated, meaning that both the ions and electrons in the plasma are at roughly the same temperature. In contrast, conventional PCVD systems use a non-isothermal plasma, where the electrons have a much higher energy than the ions. Importantly, the use of an isothermal plasma in the arrangement of the present invention allows for the reaction and deposition to occur immediately "upstream" of the plasma, shown as zone 40 in FIG. 1.

As used throughout this discussion, the term "upstream" is considered to refer to that portion of the substrate tube between first seal 16 and the created isothermal plasma. This particular upstream deposition mechanism results in the creation of molten glass particles (as opposed to soot) through homogeneous particle formation and growth, where these molten glass particles are then thermophoretically deposited upstream of the plasma, within zone 40. That is, the deposition occurs prior to the reactants entering the plasma region. A narrow heat zone (within a few inches of the center of the plasma) provides a high concentration of heat for reaction and thermophoretic deposition while the plasma further downstream heats the tube wall to prepare it for the deposit, increasing the temperature on the side wall of substrate tube 12. Thus, as plasma generator 30 traverses tube 12, the heated zone "upstream" of the plasma is the area where deposition occurs. The temperature of the inside wall is sufficient to further melt the molten glass particles and cause them to flow as they adhere to the inside wall, thus forming a uniform glass film. Importantly, the parameters of the inventive deposition process are controlled such that the reaction zone is not heated to a temperature at which the substrate will begin to vaporize (or decompose) instead of melt. The use of a low pressure within this arrangement (i.e., less than atmospheric pressure, for example, about 10 Torr), in combination with the isothermal plasma, results in this deposition zone being extremely narrow (on the order of 1% of the tube length, generally about one centimeter or less), having a definite "edge" at the boundary with the plasma. The low pressure also helps to reduce the heat content of the very high temperature plasma so that the substrate and reactants are not vaporized.

While the embodiment of the present invention as shown in FIG. 1 is useful in the formation of optical fibers from high vapor pressure compounds, there are other useful glass compositions that are not readily available using high vapor pressure compounds. For example, solid phase materials such as $GeO_2$, $SiO_2$, $La_2O_3$, $Al_2O_3$, $BaO$, $Ta_2O_5$, $Li_2O$, $Na_2O$, $K_2O$, $B_2O_3$, $Er_2O_3$, $Yb_2O_3$, $Nd_2O_3$, $Eu_2O_3$ and the like may be used in the inventive deposition process to create optical fibers exhibiting specific refractive index profiles, optical signal amplification properties or other fiber qualities not easily obtained from standard vapor phase reactants.

Figure 2:
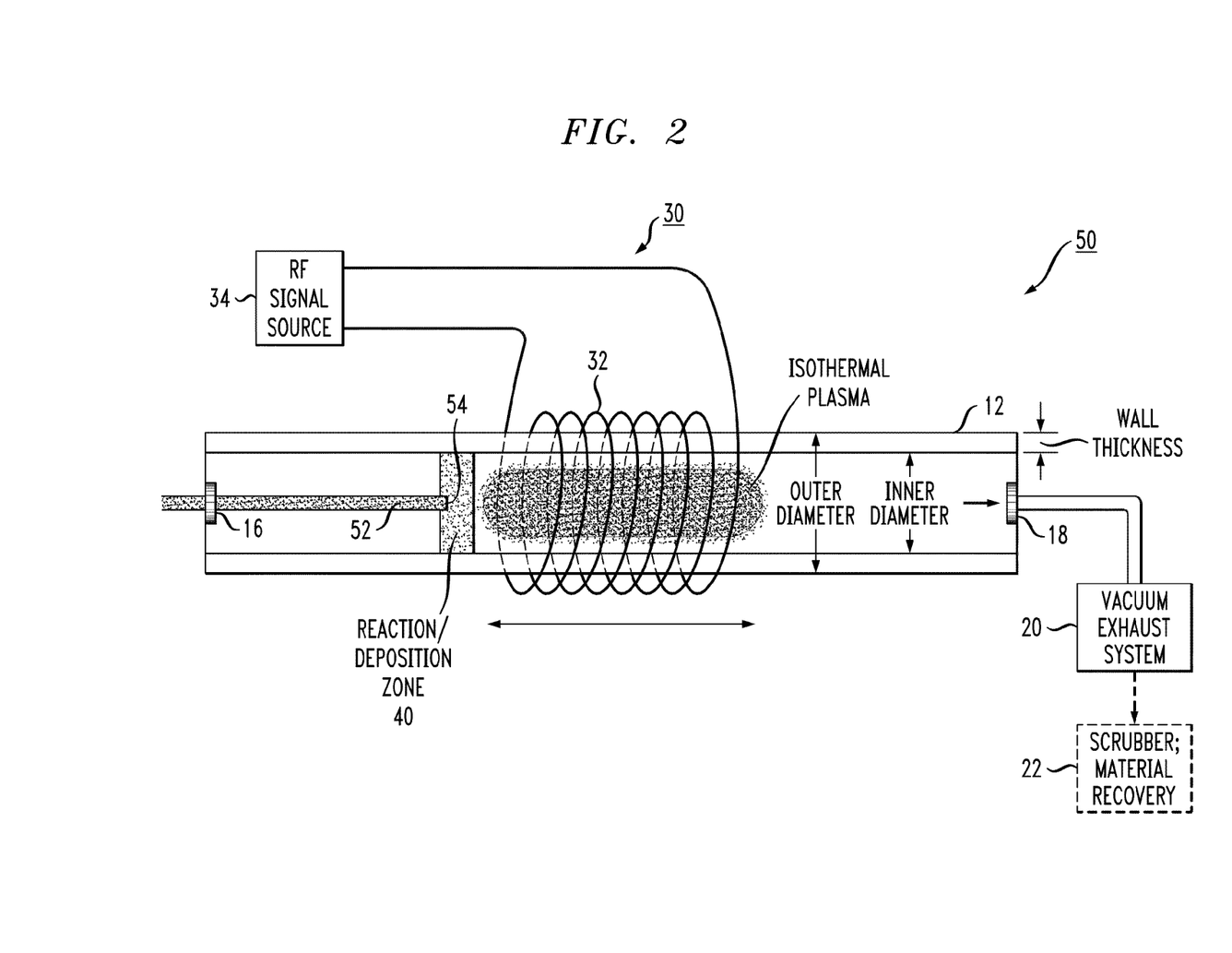
FIG. 2 is a diagram of an alternative embodiment of the present invention utilizing solid phase source materials in the deposition process.

A low pressure, isothermal deposition apparatus 50 of the present invention as shown in FIG. 2 addresses this concern by utilizing a solid source material as an input to the deposition process. Referring to FIG. 2, those components identical to the previously-described elements of apparatus 10 in FIG. 1 carry the same reference numerals. A solid source material 52 is shown as inserted through vacuum seal 16 and positioned to be disposed within reaction deposition zone 40 immediately upstream of isothermal plasma 32. As mentioned above, the selected source material is a matter of design choice, to create the desired refractive index profile of the fiber preform. Additionally, refractory materials are particularly well-suited for use as a solid phase source material, since they will not easily vaporize at relatively low temperatures. Moreover, a combination of different solid phase source materials may be used, either in the form of multiple "solids" that are introduced into substrate tube 12, or a single solid that is created to contain multiple constituents.

In accordance with this embodiment of the present invention, a terminal portion 54 of solid source material 52 is positioned within reaction deposition zone 40, where terminal portion 54 is vaporized by the isothermal plasma and thereafter deposited on the inside of substrate tube 12. Inasmuch as terminal portion 54 of solid source material 52 will continuously vaporize during processing, solid source material 52 will need to be re-positioned, from time to time, to ensure that a portion of material 52 remains within reaction deposition zone 40. Indeed, the speed of re-positioning can be used as a method for controlling the amount of source material that is vaporized, which in turn can control the final glass composition.

Figure 3:
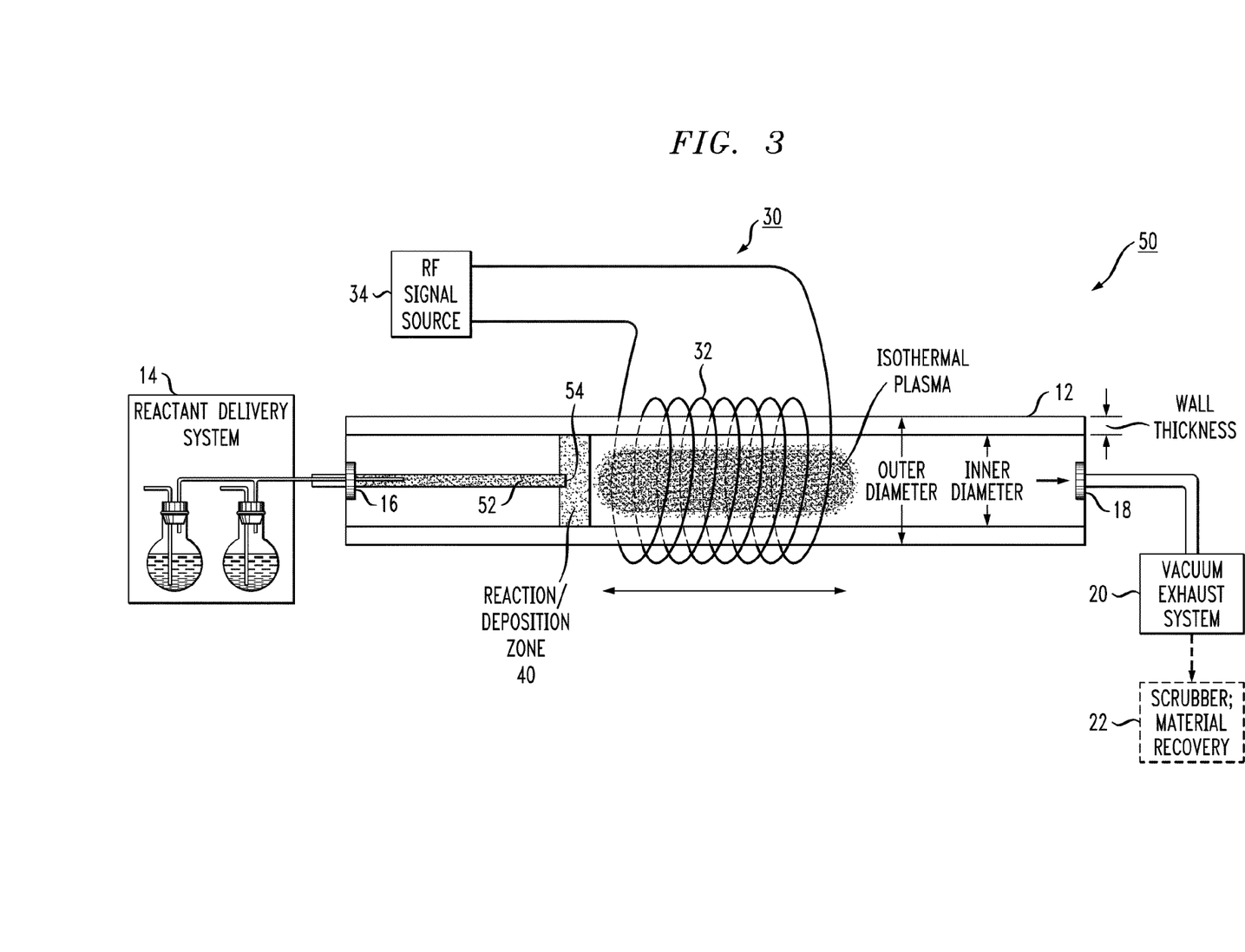
FIG. 3 illustrates yet another exemplary apparatus of the present invention, utilizing a combination of a solid rod of source material in combination with vapor phase reactants.

As mentioned above, yet another embodiment of the present invention utilizes a combination of solid phase source materials and conventional vapor phase reactants. FIG. 3 illustrates this embodiment of the present invention. In this case, various materials from reactant delivery system 14, as well as solid source material 52, are introduced upstream of reaction deposition zone 40 of substrate tube 12. In accordance with this embodiment of the present invention, terminal portion 54 of solid source material 52 will vaporize and mix with the precursor vapors introduced into substrate tube 12 from reactant delivery system 14, forming new solid-phase particles that deposit on the inside of substrate tube 12.

EXAMPLE 1

Using an isothermal plasma apparatus such as depicted in FIG. 3 and described above, a cylindrical substrate tube (in this case, a silica tube) was mounted in the apparatus connecting two vacuum seals. The cylindrical substrate tube had a 19 mm inside diameter, 25 mm outside diameter and was 2 m in length. One seal connected the substrate tube to a chemical delivery system. The other vacuum seal was connected to a vacuum system that controlled the internal pressure in the tube to 2 mbar. The vacuum seal connected to the chemical delivery system also provided a sealed opening for a rod that supported a solid source material consisting of polycrystalline $La_2O_3$. The rod was about 8 mm in diameter and 10 cm long. The rod entered the substrate tube without contacting its inner sidewall and could be systematically positioned with respect to the upstream vacuum seal. Oxygen gas from a chemical delivery system was injected into the silica substrate tube through the upstream vacuum seal at a rate of 600 cc/min. RF energy flux of sufficient magnitude to produce an isothermal plasma was provided to an RF work coil surrounding the substrate tube.

The coil and associated plasma were moved in a reciprocating fashion with respect to the substrate tube over a length of 1 m at 5 m/min. This relative motion could be achieved through motion of the plasma, the substrate tube, or a combination of the two. The $La_2O_3$ precursor support rod was initially positioned such that the $La_2O_3$ containing rod tip was outside the zone of the reciprocating plasma. From the chemical delivery system, $SiCl_4$ was added to the $O_2$ gas stream at a rate of 120 cc/min. The $SiCl_4$ reacted with the $O_2$ in a very narrow zone on the upstream side of the plasma to form micron size molten particles of silica. These particles were thermophoretically forced to the inner substrate wall, where they flowed to form a vitreous silica layer.

After the desired amount of silica was deposited, the rod consisting of the polycrystalline $La_2O_3$ was locked in sync with the apparatus, providing the plasma motion such that the distance between the tip of the $La_2O_3$ rod and the upstream side of the plasma remained essentially constant at roughly 5 cm. Following this, the distance between the tip of the $La_2O_3$ rod and the plasma was reduced until the tip of the rod reached a point at the upstream edge of the plasma where it began to be heated by the plasma. The plasma heat caused the tip of the rod to vaporize and react with the other chemicals in the gas stream surrounding the tip (which included the by-products of the reaction of the injected gas phase components). Portions of the vaporized $La_2O_3$ where then incorporated into the silica particles and deposited on the inner surface of the substrate tube, forming layers of La-doped $SiO_2$ as the plasma moved. For the given apparatus parameters used in this Example 1, the rate of La doping could be controlled by adjusting the position of the rod tip with respect to the plasma.

EXAMPLE 2

Using an isothermal plasma apparatus such as described in Example 1, an isothermal plasma was formed in a 19×25 mm silica substrate tube and moved in a reciprocating motion over a distance of 1 m at 5 in/min. The plasma was formed in an $O_2$ gas atmosphere from gas injected into the tube at 600 cc/min.

In this Example 2, the solid source material reactant of $La_2O_3$ used in Example 1 was replaced with a silicate glass rod containing a homogeneous mix of $La_2O_3$ and $SiO_2$. The proportion was 5 wt % $La_2O_3$ and 95 wt % $SiO_2$. The rod was about 8 mm in diameter and 10 cm long. As in Example 1, the rod was made to move in sync with the reciprocating plasma and systematically positioned such that the tip of the rod was kept at a point where it was vaporized by the plasma. Material from the vaporized rod formed particles of La-doped silica glass upstream of the plasma that then deposited on the inside of the substrate tube forming a La-doped glass layer.

Figure 4:
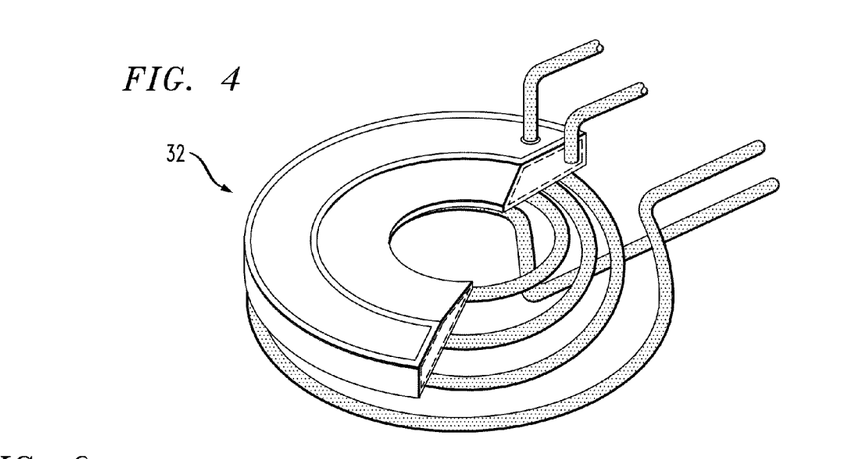
FIG. 4 is an isometric view of an exemplary concentrator coil that may be used as the resonant coil in the plasma-generating portion of the inventive apparatus.

In conventional RF plasma applications, it is typical to use a solenoid-shaped coil to induce the electro-magnetic flux. In contrast, for the particular application of the present invention (i.e., isothermal, low pressure conditions), it has been found that a concentrator coil, i.e., a coil that shapes the flux such that it is concentrated to a smaller volume, is of particular advantage. In one particular embodiment, a water-cooled RF concentrator coil 32 may be used to shape the generated plasma such that a lower power source may be used. FIG. 4 is a simplified, isometric view of one exemplary water-cooled concentrator coil that may be used in plasma generator 30 of the present invention.

Figure 5:
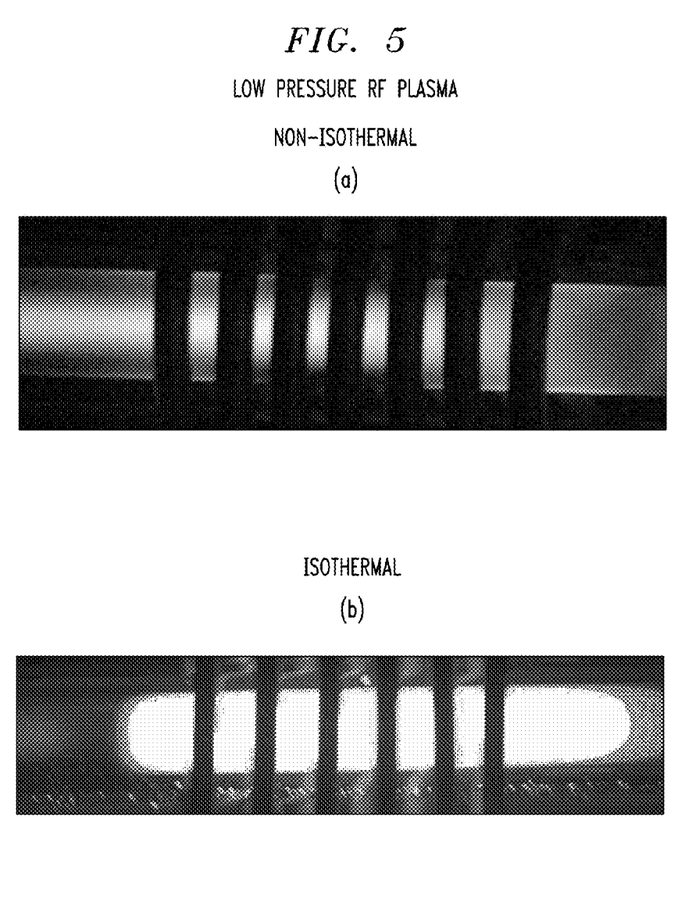

FIG. 5 contains a pair of photographs depicting the differences in plasma generation between a non-isothermal arrangement and an isothermal arrangement, where both are created at the same, low pressure using an RF source. FIG. 5(*a*) illustrates the generated non-isothermal plasma, which is shown as being rather expansive, spreading along a significant portion of the substrate length. In contrast, FIG. 5(*b*) illustrates the generated isothermal plasma, as used in the arrangement of the present invention. Clearly, the isothermal plasma is much more contained within the vicinity of the resonant coil, having well-defined boundaries, particularly on the upstream side. As mentioned above, it is the presence of this well-defined edge on the upstream side of the isothermal plasma that creates this very narrow transition region from "no plasma" to "plasma" where virtually all of the chemical reaction and deposition occurs (i.e., zone 40 as shown in FIGS. 1 and 2). The isothermal plasma basically acts as a thermophoretic "plug", forcing virtually all of the particulate to deposit upstream of the plasma.

Figure 6:
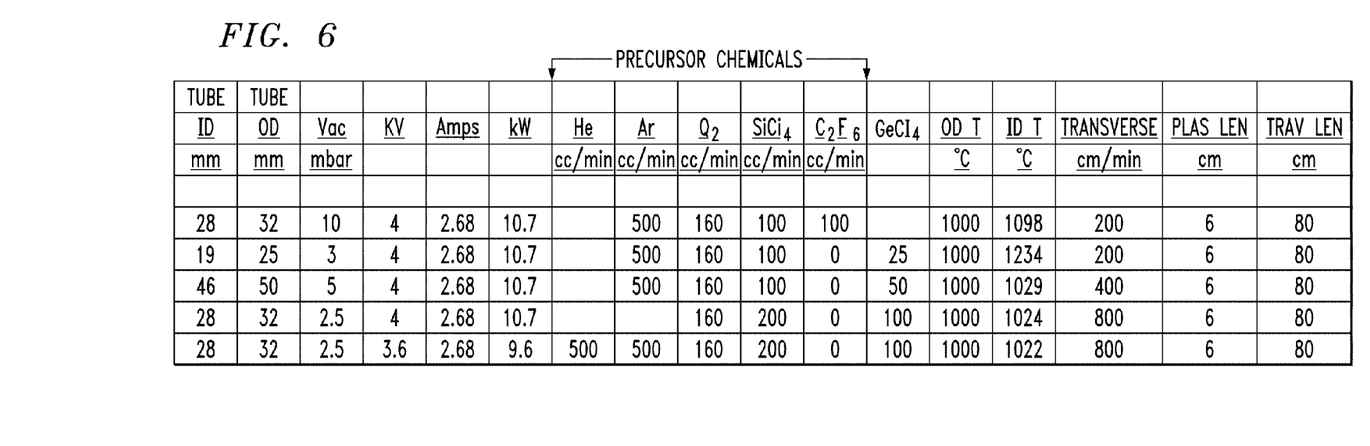
FIG. 6 is a table of various sets of operating parameters useful in forming an isothermal, low pressure deposition plasma in accordance with the present invention.

Key to achieving this plasma condition is providing a sufficient energy density to create the narrow upstream deposition zone without providing so much heat that the inner wall of the substrate tube is vaporized. There is a broad range of isothermal plasma operating conditions that have been found to provide this narrow deposition zone. In particular, the "zone" is defined as that region of energy density upstream of the plasma sufficient to bring about the reaction of the precursors and assure that the deposited material is molten glass, not soot. Several interdependent factors are taken into consideration, including (but not necessarily limited to) plasma power, substrate tube internal pressure (sub-atmospheric pressure), substrate tube inner diameter, substrate tube wall thickness, substrate tube external heating, reactant composition, reactant flow rate, plasma traverse velocity, plasma traverse length, and plasma induction source. The intent in choice of conditions is to a sufficient energy density that transfers a limited amount of heat to the substrate tube, thus minimizing the possibility of vaporizing the substrate tube wall if the temperature is too high, and avoiding the formation of bubbles in the processed glass if the temperature is too low. Various acceptable sets of conditions are shown in the table of FIG. 6, where it is to be understood that these values are exemplary only and many other combinations will provide the desired narrow reaction zone upstream of the plasma.

It is significant that the narrow deposition zone permits the deposition to be much more uniform along the entire length of the tube than the depositions achievable with conventional MCVD and PCVD processes. As a result, the process of the present invention allows for a higher yield of uniform quality optical fiber to be drawn from the preform created by the substrate tube. The inventive process also exhibits a higher deposition efficiency than other processes, leading to a further cost savings in terms of the expensive raw materials.

Isothermal plasma has previously been used for deposition inside a substrate tube. However, most of these prior art methods used an atmospheric pressure plasma, rather than the low-pressure (sub-atmospheric) plasma (e.g., 10 Torr) used in accordance with the present invention. At atmospheric pressure, the homogeneously formed particulate will be deposited as soot, subsequently fused by the plasma. Such plasma deposition at atmospheric pressure will also occur over a broader zone, since the particles under the influence of the higher gas density will be swept down the substrate tube by the gas flow. These prior art processes use the heat from the plasma to stimulate the reaction and deposition of the soot, then subsequently sinter the deposited soot layer. At atmospheric pressure, the vaporization temperature for the substrate is substantially higher, and heating the substrate to greater than 1700° C. does not present a problem. Low pressure RF plasma as used in the past was an argon plasma. Using the reported conditions, the deposition was described by the authors as being similar to that of microwave PCVD and that it occurred in the plasma without formation of particles.

An important distinction is that the inventive low pressure, isothermal plasma process apparently creates molten glass particles that are deposited on the substrate wall prior to entering the plasma (i.e., "upstream" of the plasma). No soot is created/deposited in the inventive process. Moreover, there is no evidence of additional deposition occurring in the plasma region; all deposition takes place in the narrow zone immediately upstream of the plasma. Also, the plasma is not used for any "fusing" operation in the method of the present invention. That is, since the deposited particles are glass particles and not soot, sintering is not required. In fact, achieving such fusion temperatures could be detrimental to the process.

While the above description has described a deposition process within a substrate tube, it is to be understood that the inventive features associated with creating a narrow deposition zone and eliminating a sintering process step may also be utilized with various other deposition schemes. For example, deposition on a planar surface (such as a silica wafer) can be similarly accomplished by creating the plasma in a low pressure chamber. Indeed, the depositions may occur on materials other than silica. A translating apparatus or spinning substrate with a flowing reactant stream can be used to deposit a uniform glass film. Alternatively, the depositions may be formed along the outer surface of a core rod disposed in a similar low pressure environment. Thus, the scope of the present invention is not considered to be limited to depositions within the inner walls of a substrate tube.

Various embodiments of the present invention have been described above, but it should be understood that they have been presented by way of example, and not limitation. It will be apparent to persons skilled in the relevant art that various changes in form and detail may be made therein without departing from the spirit and scope of the invention. Thus, the present invention should not be limited by any of the above-described embodiments, but should be defined only in accordance with the following claims and their equivalents.

What is claimed is:

1. A deposition process for depositing a first material on an inner wall of a substrate tube, the process comprising the steps of:
   disposing a substrate tube within a flux of a plasma generator;
   providing a desired gas composition to the interior of the substrate tube;
   maintaining an internal pressure within the substrate tube;
   creating an isothermal plasma within the substrate tube;
   inserting at least one solid into an end of the substrate tube, wherein at least a portion of the solid is disposed within a narrow zone upstream of the created isothermal plasma, the at least one solid comprising at least one second material and the narrow zone being no greater than 1% of the length of the substrate tube; and
   vaporizing the solid to form the deposited first material, such that the deposited first material comprises at least a constituent of the second material.

2. The process as defined in claim 1 wherein the deposited first material consists of only the vaporized second material.

3. The process as defined in claim 1 wherein the process further comprises the step of introducing a vapor phase reactant into the substrate tube and the deposited first material comprises at least a constituent of the second material and a constituent of the vapor phase reactant.

4. The process as defined in claim 1 wherein the substrate tube comprises a silica substrate tube.

5. The process as defined in claim 1 the inserting step further comprising inserting a plurality of solids are inserted in the substrate tube, each solid comprising a different second material and the vaporizing step further comprising vaporizing the plurality of solids such that the deposited first material comprises at least one constituent from each of the plurality of solids.

6. The process as defined in claim 1 wherein the second material is selected from the group consisting of: $GeO_2$, $SiO_2$, $Al_2O_3$, $La_2O_3$, $Ta_2O_5$, $BaO$, $Li_2O$, $Na_2O$, $K_2O$, $B_2O_3$, $Er_2O_3$, $Yb_2O_3$, $Nd_2O_3$, $Eu_2O_3$ and any combination thereof.

7. The process as defined in claim 1 wherein the second material comprises a refractory material.

8. The process as defined in claim 1 wherein the internal pressure is maintained to be less than atmospheric pressure.

9. The process as defined in claim 1 wherein the internal pressure is maintained to be less than 2 Torr.

10. The process as defined in claim 1 further comprising the step of:
    presenting at least one third material as a vapor phase reactant through the first, delivery end of the substrate tube, the at least one third material reacting with at least one constituent of the second material to form the first material deposited on the inner wall of the substrate tube.

11. The process as defined in claim 1 wherein the inserting step further comprises the step of repositioning the solid to allow for at least a portion of the solid to remain in the narrow zone upstream of the isothermal plasma.

12. The process as defined in claim 1 further comprising the step of:
    evacuating reaction by-products through a vacuum system coupled to a second, exhaust end of the substrate tube.

13. The process as defined in claim 1 further comprising the step of:
    scrubbing the evacuated reaction by-products to remove and neutralize the reaction by-products.

14. The process as defined in claim 1 further comprising the step of controlling a width of the narrow zone by one or more parameters selected from the group consisting of: plasma generator power, substrate tube internal pressure, substrate tube inner diameter, substrate tube wall thickness, substrate tube external heating, chemical reactant composition, solid rod composition, chemical reactant flow rate, isothermal plasma traverse velocity, isothermal plasma traverse length, and resonant coil configuration.

15. The process as defined in claim 1 further comprising the steps of forming an optical fiber core rod by:
    heating the substrate tube; and
    collapsing the heated substrate tube to form the optical fiber core rod.

16. The process as defined in claim 1 wherein the first material and the at least one second material are the same.

17. An isothermal, low pressure deposition apparatus comprising
    a substrate tube;
    an electromagnetic flux;
    an RF generator creating the electromagnetic flux, wherein the flux is disposed to surround and exist within at least a portion of the substrate tube, the flux and the substrate tube configured to provide for lateral movement therebetween;
    a chemical reactant delivery system for introducing at least one chemical reactant including a solid source material into the substrate tube, the solid source material interacting with the electro-magnetic field to create an isothermal plasma within the substrate tube; and
    a vacuum-based exhaust system for maintaining a pressure within the substrate tube and creating a narrow deposition zone for reactant products of the solid source material upstream of the created isothermal plasma, the narrow deposition zone being no greater than 1% of the length of the substrate tube.

18. An isothermal, low pressure deposition apparatus as defined in claim 17 wherein the apparatus further comprises a first rotary seal for coupling the solid source material to the substrate tube and a second rotary seal for coupling the vacuum-based exhaust system to the substrate tube.

19. An isothermal, low pressure deposition apparatus as defined in claim 17 wherein the flux is created by a resonating concentrator coil for shaping the electro-magnetic field into a relatively small volume within the substrate tube.

20. An isothermal, low pressure deposition apparatus as defined in claim 17 wherein the apparatus further comprises a scrubber module coupled to the vacuum-based exhaust system to remove and neutralize reaction by-products.

21. An isothermal, low pressure deposition apparatus as defined in claim 17 wherein the solid of source material is selected from the group consisting of: $GeO_2$, $SiO_2$, $Al_2O_3$, $La_2O_3$, $BaO$, $Ta_2O_5$, $Li_2O$, $Na_2O$, $K_2O$, $B_2O_3$, $Er_2O_3$, $Yb_2O_3$ and any combination thereof.

22. An optical preform fabrication apparatus comprising:
    a reactant delivery system to introduce at least solid source materials into an upstream side of a substrate tube;
    a pressure-control system to maintain a predetermined pressure within the substrate tube; and
    a flux configured to generate an isothermal plasma within the substrate tube, such that the introduced source materials vaporize and deposit on the substrate tube inner wall in a narrow zone upstream of the isothermal plasma, the narrow zone being no greater than 1% of the length of the substrate tube.

23. The apparatus of claim 22 wherein the flux is created by a shaped, concentrator coil configured to produce a shaped electro-magnetic field occupying a relatively small volume.

* * * * *